US012092278B2

(12) United States Patent
de Mersseman et al.

(10) Patent No.: US 12,092,278 B2
(45) Date of Patent: Sep. 17, 2024

(54) GENERATING A SPOTLIGHT

(71) Applicant: Magna Electronics, LLC, Southfield, MI (US)

(72) Inventors: Bernard de Mersseman, Lowell, MA (US); Peter Hansson, Stockholm (SE)

(73) Assignee: Magna Electronics, LLC, Southfield, MI (US)

( * ) Notice: Subject to any disclaimer, the term of this patent is extended or adjusted under 35 U.S.C. 154(b) by 0 days.

(21) Appl. No.: 17/962,001

(22) Filed: Oct. 7, 2022

(65) Prior Publication Data

US 2024/0117947 A1 Apr. 11, 2024

(51) Int. Cl.

| | |
|---|---|
| ***F21S 41/176*** | (2018.01) |
| ***F21S 41/16*** | (2018.01) |
| ***F21S 41/20*** | (2018.01) |
| ***F21S 41/675*** | (2018.01) |

(52) U.S. Cl.

CPC ............. *F21S 41/176* (2018.01); *F21S 41/16* (2018.01); *F21S 41/20* (2018.01); *F21S 41/675* (2018.01)

(58) Field of Classification Search

CPC .... F21S 41/16; F21S 41/176–18; F21S 41/20; F21S 41/67–675

See application file for complete search history.

(56) References Cited

U.S. PATENT DOCUMENTS

| | | | |
|---|---|---|---|
| 1,520,245 | A | 12/1924 | Jules |
| 3,712,985 | A | 1/1973 | Swarner et al. |
| 3,898,656 | A | 8/1975 | Jensen |
| 4,125,864 | A | 11/1978 | Aughton |
| 4,184,154 | A | 1/1980 | Albanese et al. |
| 4,362,361 | A | 12/1982 | Campbell et al. |
| 4,439,766 | A | 3/1984 | Kobayashi et al. |
| 4,765,715 | A | 8/1988 | Matsudaira et al. |
| 4,957,362 | A | 9/1990 | Peterson |
| 5,200,606 | A | 4/1993 | Krasutsky et al. |
| 5,210,586 | A | 5/1993 | Grage et al. |
| 5,274,379 | A | 12/1993 | Carbonneau et al. |
| 5,428,215 | A | 6/1995 | Dubois et al. |
| 5,604,695 | A | 2/1997 | Cantin et al. |
| 5,793,491 | A | 8/1998 | Wangler et al. |
| 5,889,490 | A | 3/1999 | Wachter et al. |
| 5,966,226 | A | 10/1999 | Gerber |

(Continued)

FOREIGN PATENT DOCUMENTS

| | | |
|---|---|---|
| AT | 509180 | 6/2011 |
| AU | 6638286 A | 6/1987 |

(Continued)

OTHER PUBLICATIONS

"A milestone for laswer sensors in self-driving cars," OSRAM Opto Semiconductors, Trade Press, Jul. 2016, 3 pages.

(Continued)

*Primary Examiner* — Jason M Han

(74) *Attorney, Agent, or Firm* — Burns & Levinson LLP; Daniel J . McGrath

(57) ABSTRACT

An example system includes a light source coated with a phosphor layer, a laser emitter to output a laser beam, and a controller to control a direction of the laser beam so that the laser beam hits a location on the phosphor layer. The laser beam excites the location on the phosphor layer to produce a spotlight at the location.

21 Claims, 8 Drawing Sheets

(56) References Cited

U.S. PATENT DOCUMENTS 6,078,395 A 6/2000 Jourdain et al.
6,122,222 A 9/2000 Hossack et al.
6,292,285 B1 9/2001 Wang et al.
6,384,770 B1 5/2002 De Gouy et al.
6,437,854 B2 8/2002 Hahlweg
6,556,282 B2 4/2003 Jamieson et al.
6,559,932 B1 5/2003 Halmos
7,202,941 B2 4/2007 Munro
7,227,116 B2 6/2007 Gleckler
7,272,271 B2 9/2007 Kaplan et al.
7,440,084 B2 10/2008 Kane
7,483,600 B2 1/2009 Achiam et al.
7,489,865 B2 2/2009 Varshneya et al.
7,544,945 B2 6/2009 Tan et al.
7,570,347 B2 8/2009 Ruff et al.
7,675,610 B2 3/2010 Redman et al.
7,832,762 B2 11/2010 Breed
8,044,999 B2 10/2011 Mullen et al.
8,050,863 B2 11/2011 Trepagnier et al.
8,134,637 B2 3/2012 Rossbach et al.
8,223,215 B2 7/2012 Oggier et al.
8,363,511 B2 1/2013 Frank et al.
8,508,723 B2 8/2013 Chang et al.
8,629,975 B1 1/2014 Dierking et al.
8,742,325 B1 6/2014 Droz et al.
8,836,761 B2 9/2014 Wang et al.
8,836,922 B1 9/2014 Pennecot et al.
8,879,050 B2 11/2014 Ko
9,007,569 B2 4/2015 Amzajerdian et al.
9,063,549 B1 6/2015 Pennecot et al.
9,086,273 B1 7/2015 Gruver et al.
9,090,213 B2 7/2015 Lawlor et al.
9,097,646 B1 8/2015 Campbell et al.
9,140,792 B2 9/2015 Zeng et al.
9,157,790 B2 10/2015 Shpunt et al.
9,267,787 B2 2/2016 Shpunt et al.
9,285,477 B1 3/2016 Smith et al.
9,482,412 B2 * 11/2016 Schwaiger ................ F21K 9/64
9,575,162 B2 2/2017 Owechko
9,618,742 B1 4/2017 Droz et al.
9,651,417 B2 5/2017 Shpunt et al.
9,658,322 B2 5/2017 Lewis
9,696,427 B2 7/2017 Wilson et al.
9,711,493 B2 7/2017 Lin
9,753,351 B2 9/2017 Eldada
9,823,351 B2 11/2017 Haslim et al.
9,857,472 B2 1/2018 Mheen et al.
9,869,754 B1 1/2018 Campbell et al.
10,018,725 B2 7/2018 Liu
10,018,726 B2 7/2018 Hall et al.
10,024,655 B2 7/2018 Raguin et al.
10,078,133 B2 9/2018 Dussan
10,088,557 B2 10/2018 Yeun
10,148,060 B2 12/2018 Hong et al.
10,175,360 B2 1/2019 Zweigle et al.
10,183,541 B2 1/2019 Van Den Bossche et al.
10,369,922 B2 8/2019 Nakashima et al.
10,408,924 B2 9/2019 Mheen et al.
10,411,524 B2 9/2019 Widmer et al.
10,416,292 B2 9/2019 De Mersseman et al.
10,473,767 B2 11/2019 Xiang et al.
10,473,784 B2 11/2019 Puglia
10,473,943 B1 11/2019 Hughes
10,551,501 B1 2/2020 Lachapelle
10,557,923 B2 2/2020 Watnik et al.
10,558,044 B2 2/2020 Pan
10,564,268 B2 2/2020 Turbide et al.
10,578,724 B2 3/2020 Droz et al.
10,627,493 B2 4/2020 Morikawa et al.
10,678,117 B2 6/2020 Shin et al.
10,768,346 B2 9/2020 Miner et al.
10,775,508 B1 9/2020 Rezk et al.
10,937,773 B2 3/2021 T'ng et al.
11,326,758 B1 5/2022 de Mersseman
2001/0052872 A1 12/2001 Hahlweg
2003/0043363 A1 3/2003 Jamieson et al.
2004/0028418 A1 2/2004 Kaplan et al.
2004/0031906 A1 2/2004 Gleckler
2004/0135992 A1 7/2004 Munro
2004/0155249 A1 8/2004 Narui et al.
2005/0219506 A1 10/2005 Okuda et al.
2006/0072189 A1 4/2006 Dimarzio et al.
2006/0221250 A1 10/2006 Rossbach et al.
2006/0232052 A1 10/2006 Breed
2006/0239312 A1 10/2006 Kewitsch et al.
2007/0140613 A1 6/2007 Achiam et al.
2007/0181810 A1 8/2007 Tan et al.
2007/0211786 A1 9/2007 Shattil
2007/0219720 A1 9/2007 Trepagnier et al.
2008/0088499 A1 4/2008 Bonthron et al.
2008/0095121 A1 4/2008 Shattil
2008/0100510 A1 5/2008 Bonthron et al.
2008/0219584 A1 9/2008 Mullen et al.
2008/0246944 A1 10/2008 Redman et al.
2009/0002680 A1 1/2009 Ruff et al.
2009/0010644 A1 1/2009 Varshneya et al.
2009/0190007 A1 7/2009 Oggier et al.
2009/0251361 A1 10/2009 Beasley
2010/0027602 A1 2/2010 Abshire et al.
2010/0157280 A1 6/2010 Kusevic et al.
2010/0182874 A1 7/2010 Frank et al.
2012/0075422 A1 3/2012 Wang et al.
2012/0182540 A1 7/2012 Suzuki et al.
2012/0206712 A1 8/2012 Chang et al.
2012/0236379 A1 9/2012 Da Silva et al.
2012/0310516 A1 12/2012 Zeng
2012/0310519 A1 12/2012 Lawlor et al.
2013/0088726 A1 4/2013 Goyal et al.
2013/0093584 A1 4/2013 Schumacher
2013/0120760 A1 5/2013 Raguin et al.
2013/0166113 A1 6/2013 Dakin et al.
2013/0206967 A1 8/2013 Shpunt et al.
2013/0207970 A1 8/2013 Shpunt et al.
2013/0222786 A1 8/2013 Hanson et al.
2013/0250276 A1 9/2013 Chang et al.
2013/0265561 A1 10/2013 Takahira et al.
2014/0009747 A1 1/2014 Suzuki et al.
2014/0036252 A1 2/2014 Amzajerdian et al.
2014/0049609 A1 2/2014 Wilson et al.
2014/0152975 A1 6/2014 Ko
2014/0168631 A1 6/2014 Haslim et al.
2014/0233942 A1 8/2014 Kanter
2014/0313519 A1 10/2014 Shpunt et al.
2015/0009485 A1 1/2015 Mheen et al.
2015/0055117 A1 2/2015 Pennecot et al.
2015/0234308 A1 8/2015 Lim et al.
2015/0260843 A1 9/2015 Lewis
2015/0301162 A1 10/2015 Kim
2015/0371074 A1 12/2015 Lin
2015/0378011 A1 12/2015 Owechko
2016/0047895 A1 2/2016 Dussan
2016/0047896 A1 2/2016 Dussan
2016/0047903 A1 2/2016 Dussan
2016/0138944 A1 5/2016 Lee et al.
2016/0178749 A1 6/2016 Lin et al.
2016/0200161 A1 7/2016 Van Den Bossche et al.
2016/0245902 A1 8/2016 Watnik et al.
2016/0280229 A1 9/2016 Kasahara
2016/0291160 A1 10/2016 Zweigle et al.
2016/0357187 A1 12/2016 Ansari
2016/0363669 A1 12/2016 Liu
2016/0380488 A1 12/2016 Widmer et al.
2017/0023678 A1 1/2017 Pink et al.
2017/0090013 A1 3/2017 Paradie et al.
2017/0102457 A1 4/2017 Li et al.
2017/0199273 A1 7/2017 Morikawa et al.
2017/0219696 A1 8/2017 Hayakawa et al.
2017/0269215 A1 9/2017 Hall et al.
2017/0270381 A1 9/2017 Itoh et al.
2017/0285346 A1 10/2017 Pan
2017/0307736 A1 10/2017 Donovan
2017/0307737 A1 10/2017 Ishikawa et al.
2017/0310948 A1 10/2017 Pei et al.
2017/0329010 A1 11/2017 Warke et al.

(56) References Cited

U.S. PATENT DOCUMENTS

| | | | |
|---|---|---|---|
| 2017/0329011 A1 | 11/2017 | Warke et al. | |
| 2018/0052378 A1 | 2/2018 | Shin et al. | |
| 2018/0113193 A1 | 4/2018 | Huemer et al. | |
| 2018/0128903 A1 | 5/2018 | Chang | |
| 2018/0136328 A1 | 5/2018 | Moss | |
| 2018/0143309 A1 | 5/2018 | Pennecot et al. | |
| 2018/0180718 A1 | 6/2018 | Lin | |
| 2018/0224529 A1 | 8/2018 | Wolf et al. | |
| 2018/0241477 A1 | 8/2018 | Turbide et al. | |
| 2018/0275249 A1 | 9/2018 | Campbell et al. | |
| 2018/0275275 A1 | 9/2018 | Lundquist | |
| 2018/0284237 A1 | 10/2018 | Campbell et al. | |
| 2018/0284282 A1 | 10/2018 | Hong et al. | |
| 2018/0284286 A1 | 10/2018 | Eichenholz et al. | |
| 2018/0286909 A1 | 10/2018 | Eichenholz et al. | |
| 2018/0306913 A1 | 10/2018 | Bartels | |
| 2018/0341009 A1 | 11/2018 | Niclass et al. | |
| 2018/0364334 A1 | 12/2018 | Xiang et al. | |
| 2018/0372870 A1 | 12/2018 | Puglia | |
| 2019/0018143 A1 | 1/2019 | Thayer et al. | |
| 2019/0101644 A1 | 4/2019 | De Mersseman et al. | |
| 2019/0113200 A1 | 4/2019 | Murakami | |
| 2019/0123508 A1 | 4/2019 | Hong et al. | |
| 2019/0129009 A1 | 5/2019 | Eichenholz et al. | |
| 2019/0139951 A1 | 5/2019 | T'ng et al. | |
| 2019/0146060 A1 | 5/2019 | Qiu et al. | |
| 2019/0195990 A1 | 6/2019 | Shand | |
| 2019/0221988 A1 | 7/2019 | Villeneuve et al. | |
| 2019/0235064 A1 | 8/2019 | Droz et al. | |
| 2019/0242978 A1 | 8/2019 | Weed et al. | |
| 2019/0265336 A1 | 8/2019 | Zhang et al. | |
| 2019/0310351 A1 | 10/2019 | Hughes et al. | |
| 2020/0081129 A1 | 3/2020 | De Mersseman et al. | |
| 2020/0088847 A1 | 3/2020 | De Mersseman et al. | |
| 2020/0249354 A1 | 8/2020 | Yeruhami et al. | |
| 2020/0284906 A1 | 9/2020 | Eichenholz et al. | |
| 2020/0341120 A1 | 10/2020 | Ahn et al. | |
| 2020/0341121 A1 | 10/2020 | Ahn et al. | |
| 2021/0018602 A1 | 1/2021 | De Mersseman et al. | |
| 2021/0190919 A1 | 6/2021 | de Mersseman | |
| 2022/0146817 A1 | 5/2022 | Erdl et al. | |
| 2022/0333757 A1* | 10/2022 | Li | F21S 41/147 |
| 2022/0403998 A1 | 12/2022 | De Mersseman et al. | |

FOREIGN PATENT DOCUMENTS

| | | |
|---|---|---|
| CN | 102508258 | 6/2012 |
| DE | 19731754 | 2/1999 |
| DE | 19757840 | 9/1999 |
| DE | 102004033944 | 2/2006 |
| DE | 102006031114 | 1/2008 |
| DE | 102008045387 | 3/2010 |
| DE | 102014218957 | 3/2016 |
| DE | 102015217908 | 3/2017 |
| DE | 102015224692 | 6/2017 |
| DE | 102016201606 | 8/2017 |
| EP | 0112188 | 6/1984 |
| EP | 0578129 | 1/1994 |
| EP | 2124069 | 11/2009 |
| EP | 2696166 | 2/2014 |
| EP | 2824418 | 1/2015 |
| EP | 3147685 | 3/2017 |
| EP | 3203259 | 8/2017 |
| EP | 3457080 | 3/2019 |
| IT | 201800001765 | 7/2019 |
| JP | 2002148556 | 5/2002 |
| JP | 2018041723 | 3/2018 |
| KR | 20190105889 | 9/2019 |
| WO | 1994019705 | 9/1994 |
| WO | 03009048 | 1/2003 |
| WO | 2008/008970 | 1/2008 |
| WO | 2015/014556 | 2/2015 |
| WO | 2016072483 | 5/2016 |
| WO | 2016/097409 | 6/2016 |
| WO | 2016204138 | 12/2016 |
| WO | 2018229131 A1 | 12/2018 |
| WO | 2019050643 | 3/2019 |
| WO | 2019099166 | 5/2019 |
| WO | 2020243038 A1 | 12/2020 |

OTHER PUBLICATIONS

"Advanced Scientific Concepts," http://www.advancedscientificconcepts.com/products/overview.html, 2015, 4 pages.

"Cameras," Continental Automotive, https://www.continental-automotive.com/en-gl/Passenger-Cars/Chassis-Safety/Advanced-Driver-Assistance-Systems/Cameras, 2017, 2 pages.

"Hi-Res 3D Flash LIDAR will supplement Continental's existing portfolio for automated driving," Continental AG, Mar. 2016, 2 pages.

"Multi Function Camera with Lidar," Continental Automotive, https://www.continental-automotive.com/en-gl/Passenger-Cars/Chassis-Safety/Advanced-Driver-Assistance-Systems/Cameras/Multi-Function-Camera-with-Lidar, 2017, 2 pages.

Campbell et al., "Advanced sine wave modulation of continuous wave laser system for atmospheric CO2 differential absorption measurements," NASA Langley Research Center; 32 pages.

Church et al., "Evaluation of a steerable 3D laser scanner using a double Risley prism pair," SPIE Paper, 9 pages.

Hewlett-Packard Application Note 77-4, "Swept-Frequency Group Delay Measurements," Hewlett-Packard Co., Sep. 1968, 7 pages.

Journet & Bazin, "A Low-Cost Laser Range Finder Based on an FMCW-Like Method," IEEE Transactions on Instrumentation and Measurement, vol. 49, No. 4, Aug. 2000, 4 pages.

Kahn, "Modulation and Detection Techniques for Optical Communication Systems," OSA/COTA, 2006, 3 pages.

Kasturi et al., "UAV-Borne LiDAR with MEMS Mirror Based Scanning Capability," SPIE Defense and Commercial Sensing Conference, Apr. 2016, 10 pages.

Kravitz et al., "High-Resolution Low-Sidelobe Laser Ranging Based on Incoherent Pulse Compression," IEEE Photonics Technology Letters, vol. 24, No. 23, Dec. 2012, 3 pages.

Levanon et al., "Non-coherent pulse compression—aperiodic and periodic waveforms," IET Radar Sonar Navig., Jun. 2015, 9 pages.

Li et al., "Investigation of beam steering performances in rotation Risley-prism scanner," OSA, Jun. 2016, 11 pages.

Li, "Time-of-Flight Camera—An Introduction," Technical White Paper, SLOA190B, May 2014, 10 pages.

Luhmann, "A historical review on panorama photogrammetry," University of Applied Sciences, Jul. 2008, 9 pages.

Niclass et al., "Development of Automotive LIDAR," Electronics and Communications in Japan, vol. 98, No. 5, 2015, pp. 1-6.

Peer & Levanon, "Compression Waveforms for Non-Coherent Radar," Compression Waveforms for Non-Coherent Radar, Tel Aviv University; 6 pages.

Pierrottet et al., "Linear FMCW Laser Radar for Precision Range and Vector Velocity Measurements," Coherent Applications Inc. & NASA Langley Research Center, 9 pages.

Simpson et al., "Intensity-modulated, stepped frequency cw lidar for distributed aerosol an dhard target measurements," Applied Optics, vol. 44, No. 33, Nov. 2005, 8 pages.

Skolnik, "Introduction to Radar Systems," McGraw-Hill Higher Education, 2001, 6 pages.

Su et al., "2-D FFT and Time-Frequency Analysis Techniques for Multi-Target Recognition of FMCW Radar Signal," Proceedings of the Asia-Pacific Microwave Conference, 2011, 4 pages.

Thorlabs Application Note, Risley Prism Scanner; 33 pages.

Wang et al., "Range-Doppler image processing in linear FMCW radar and FPGA based real-time implementation," Journal of Communication and Computer, vol. 6, No. 4, Apr. 2009, 5 pages.

Wien, "The Geometry of Airborne Laser Scanning in a Kinematical Framework," Vienna University of Technology, Oct. 2016, 69 pages.

Winkler, "Range Doppler Detection for automotive FMCW Radars," Proceedings of the 4th European Radar Conference, Oct. 2007, 4 pages.

(56) References Cited

OTHER PUBLICATIONS

Wojtkiewicz et al., "Two-dimensional signal processing in FMCW radars," Instytut Podstaw Elektroniki, 6 pages.
Invitation to Pay Additional Fees and, Where Applicable, Protest Fee issued in International Application No. PCT/US2018/052849 on Mar. 8, 2019.
International Search Report and Written Opinion issued in International Application No. PCT/US2018/052849 on May 6, 2019.
International Search Report and Written Opinion issued in International Application No. PCT/US2018/057676 on Jan. 23, 2019.
International Search Report and Written Opinion issued in International Application No. PCT/US2019/046800 on Nov. 25, 2019.
International Search Report and Written Opinion issued in International Application No. PCT/US2020/039760 on Sep. 18, 2020.
International Search Report and Written Opinion issued in International Application No. PCT/US2020/064474 on Apr. 1, 2021.
International Search Report and Written Opinion issued in International Application No. PCT/US2017/033263 on Aug. 29, 2017.
International Search Report and Written Opinion issued in International Application No. PCT/US2017/033265 on Sep. 1, 2017.
International Search Report and Written Opinion issued in International Application No. PCT/US2017/033271 on Sep. 1, 2017.
International Search Report and Written Opinion issued in International Application No. PCT/US2018/048869 on Nov. 8, 2018.
International Search Report and Written Opinion issued in International Application No. PCT/US2018/049038 on Dec. 12, 2018.
International Search Report and Written Opinion issued in International Application No. PCT/US2018/051281 on Nov. 22, 2018.
International Search Report and Written Opinion issued in International Application No. PCT/US2018/052837 on Jan. 24, 2019.
International Search Report and Written Opinion issued in International Application No. PCT/US2018/054992 on Dec. 11, 2018.
International Search Report and Written Opinion issued in International Application No. PCT/US2018/057727 on Jan. 28, 2019.
International Search Report and Written Opinion issued in International Application No. PCT/US2023/034129 on Jan. 3, 2024.
International Search Report and Written Opinion issued in International Application No. PCT/US2023/034131 on Dec. 21, 2023.

* cited by examiner

GENERATING A SPOTLIGHT

TECHNICAL FIELD

This specification describes examples of techniques for generating a spotlight by directing laser light onto phosphor.

BACKGROUND

A vehicle, such as an automobile, includes an illumination system. The illumination system includes lights on the front, the back and, in some cases, the sides of the vehicle. A headlight, for example, is located on the front of the vehicle and illuminates a path in front the vehicle, at least partly.

SUMMARY

An example system includes a light source coated with a phosphor layer, a laser emitter to output a laser beam, and a controller to control a direction of the laser beam so that the laser beam hits a location on the phosphor layer. The laser beam excites the location on the phosphor layer to produce a spotlight at the location. The system may include one or more of the following features, either alone or in combination.

The spotlight may have a luminous intensity that exceeds a luminous intensity of light produced by the light source at the location absent the laser beam exciting the location. The controller may be configured to control the direction of the laser beam so that the laser beam hits the location on the phosphor layer when the light source is activated or when the light source is not activated. The system may include a steerable device to direct the laser beam to the phosphor layer. The steerable device may include a micro-electromechanical device such as a mirror that is movable.

The system may include another mirror to receive the laser beam from the steerable device and to reflect the laser beam to the phosphor layer. The steerable device may be controllable by the controller to move the laser beam to different points on this other mirror and therefore to different locations on the phosphor layer. One or more optical elements may be in an optical path between the other mirror and the steerable device. The one or more optical elements may include a lens to focus the laser beam onto the phosphor layer. The laser emitter may include a laser diode and a collimating lens. The laser diode may be configured to emit blue light and the phosphor layer may be configured to convert the blue light to white light.

The spotlight may have a luminous flux of at least 250 Lumens and the laser beam may have an optical power of at least 1 Watt. The phosphor layer may include cerium-doped yttrium aluminum garnet. The phosphor layer may include a europium doped nitridoaluminate. The light source may include a gallium-nitride (GaN) based light-emitting diode (LED) device. The laser emitter may be movable. Movement of the laser emitter may be controllable by the controller to control the direction of the laser beam so that the laser beam hits targeted location(s) on the phosphor layer.

The system may be, or be part of, a vehicle. The light source may be part of a headlight for the vehicle. The controller may be configured to control the direction of the laser beam based on an external illumination in an environment in which the vehicle is located. The controller may be configured to control the direction of the laser beam based on an object in a vicinity of the vehicle. The controller may be configured to control a direction of the laser beam based on an operator of the vehicle.

An example method of producing a spotlight uses a light source having a phosphor layer. The method includes receiving a signal based on one or more environmental factors, where the signal is usable to decide where the spotlight is to be directed in the environment, and directing a laser beam to a location on the phosphor layer based on the signal. The laser beam excites the location on the phosphor layer to produce the spotlight at the location. In a case that the light source is activated, the spotlight has a luminous intensity that exceeds a luminous intensity of light produced by light source at the location absent the laser beam exciting the location. The method may include one or more of the following features, either alone or in combination.

The system may be, or be part of, a vehicle. The one or more environmental factors may be obtained from one or more sensors and may include one or more of: an external illumination in an environment in which the vehicle is located, an object in a vicinity of the vehicle, operation of the vehicle over a predefined period of time, or a direction that an operator of the vehicle is looking. The phosphor layer may include cerium-doped yttrium aluminum garnet. The phosphor layer may include europium doped nitridoaluminate. The light source may include a gallium-nitride (GaN) based light-emitting diode (LED) device. The method may include turning-off the laser beam after a predefined period of time. The predefined period of time may be based, at least in part, on a composition of the phosphor layer. The spotlight may be produced when the light source is activated or when the light source is inactive.

Any two or more of the features described in this specification, including in this summary section, may be combined to form implementations not specifically described in this specification.

The systems, techniques, components, structures, and variations thereof described herein, or portions thereof, can be implemented using, or controlled by, a computer program product that includes instructions that are stored on one or more non-transitory machine-readable storage media, and that are executable on one or more processing devices to execute at least some of the operations described herein. The systems, techniques, components, structures, and variations thereof described herein, or portions thereof, can be implemented as an apparatus, method, or electronic system that can include one or more processing devices and computer memory to store executable instructions to implement various operations. The systems, techniques, components, structures, and variations thereof described herein may be configured, for example, through design, construction, size, shape, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of systems for generating a spotlight to project onto a target. In an example, the spotlight includes a relatively narrow, intense beam of light. The system may be part of a vehicle, such an automobile. The spotlight may be generated using existing components of the vehicle's illumination system, such as its headlights, and may controlled to point in various directions. Control over spotlight operation and various components described herein may be implemented by a control system, examples of which are described below.

Figure 1:
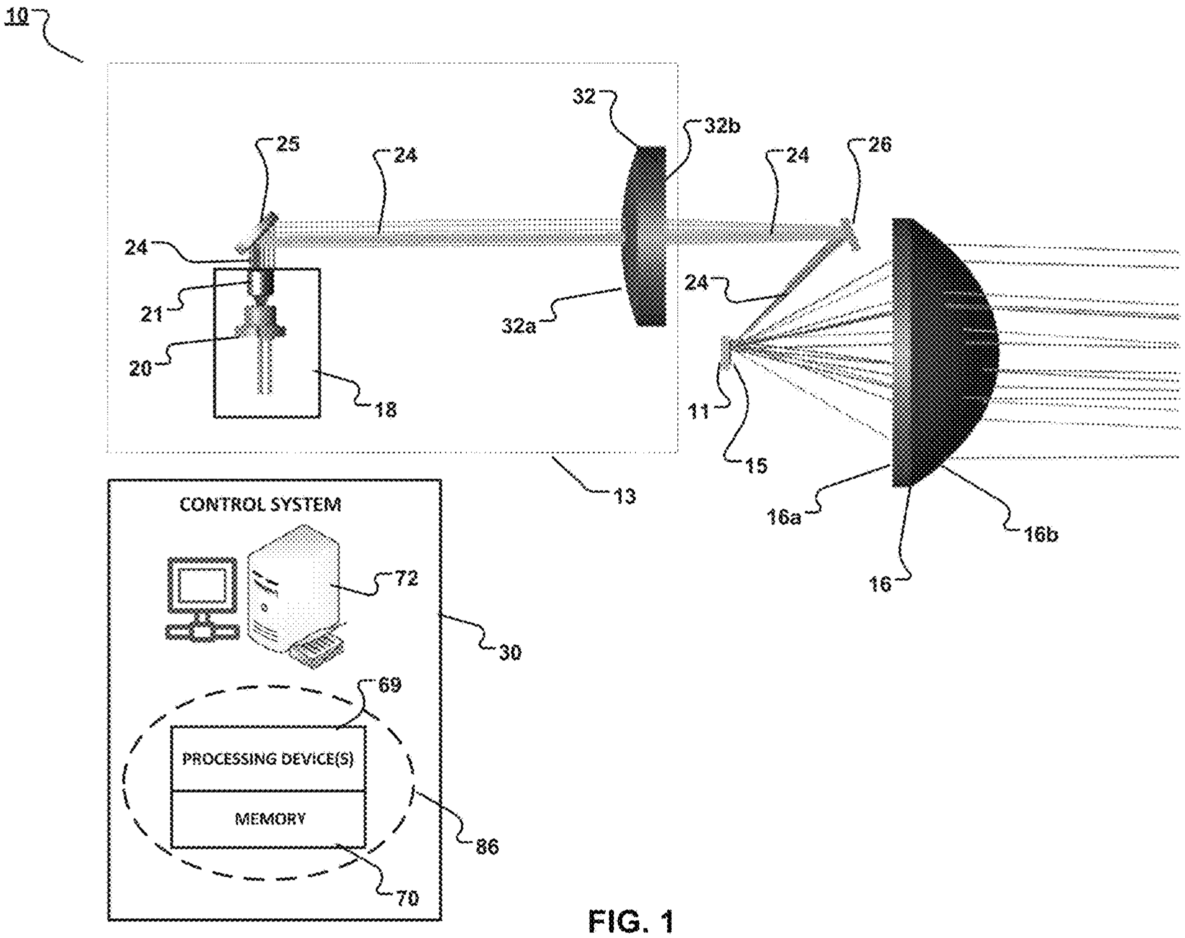
FIG. 1 is a schematic diagram of an example system configuration for generating a spotlight by directing laser light onto phosphor.
Figure 2:
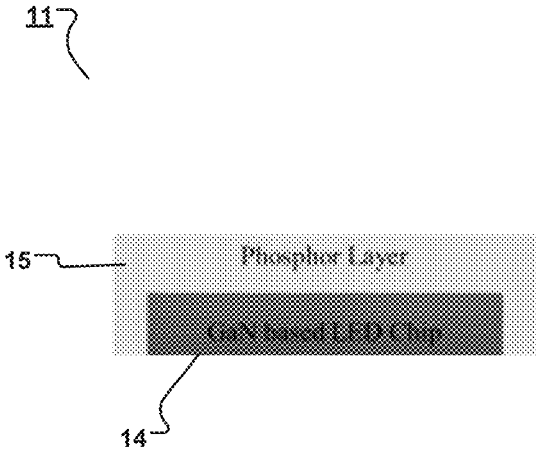
FIG. 2 is a block diagram of components of an example light source containing light-emitting diodes and a phosphor layer.

FIG. 1 shows components of an example system 10 of the preceding type for generating a spotlight. The components include a light source 11 coated with a phosphor layer. Referring to FIG. 2, in this example, light source 11 includes a gallium-nitride (GaN)-based light-emitting diode (LED) chip 14. The GaN LED chip includes a matrix of collocated individual LEDs that emit blue light when activated. Blue light is typically considered to have wavelengths within in a range of 380 nanometers (nm) to 495 nm. Light having any wavelength in this range may be used. The GaN LED chip emits light having a wavelength of about 450 nm. In some implementations, light other than blue light, such as white light, may be emitted by the light source.

The GaN LED chip 14 of light source 11 is coated with a phosphor layer 15. Phosphor layer 15 converts the blue light from the GaN LED chip into white light for output from the vehicle's headlight. In an example, phosphor layer 15 includes cerium-doped yttrium aluminum garnet. However, other types of phosphors may be used such as, but not limited to, europium doped nitridoaluminate.

System 10 also include a lens 16. In this example, lens 16 is at the output of a vehicle 40's headlight 17*a* or 17*b*, as shown in FIG. 3. Lens 16 includes a flat surface 16*a* and a convex surface 16*b*. During headlight operation, light source 11 is activated to produce white light that enters lens 16 and that is output based on the focal length of the lens and the position of the light source in the lens' focal plane. The output light illuminates at least part of the front of the vehicle. The headlight may be controllable by the operator and/or the control system to operate in different modes such as low-beam operation and high-beam operations. During low-beam operation, the light from a single headlight is typically on the order of 700 lumens. During high-beam operation, the light from the single headlight is typically on the order of 1200 lumens. However, different vehicles may produce different brightness for different low-beam and high-beam modes of operation. In some implementations, during normal headlight operation (that is, operation of the headlight without a spotlight), the direction of the output light is not controllable; that is, the output light simply disperses in front of the vehicle. In some implementations, during normal headlight operation, the direction of the output light is controllable. For example, light source 11 may be controlled to move to direct the light output at specific angles based on signals received from the control system.

As shown in FIG. 1, system 10 also includes components for generating a spotlight for output from the headlight. In an example, these components include a laser emitter 18 configured to output a laser beam. Laser emitter 18 includes a laser diode 20 to produce a blue-light laser and a collimating lens 21 configured to produce a collimated laser beam 24. In this example, laser diode 20 and collimating lens 21 are stationary (that is static or immobile relative to other components of the system); however, that is not the case in all implementations. Also, the laser beam in this example is a blue light laser beam; however, other implementations may use different types of laser beams including laser beams based on different wavelengths of light.

To generate the spotlight, a direction of the laser beam 24 is controlled so that the laser beam hits a location on phosphor layer 15 of light source 11. The laser beam excites the phosphor at the location. The resulting excitation causes the phosphor layer to illuminate intensely at the location. In some examples, the intense illumination occurs only at the location, although there may be some additional incidental illumination in a small concentric area around the location. The result is a relatively narrow, intense beam of light as compared to normal headlight light output that does not result from laser excitation of the phosphor. This relatively narrow, intense beam of light travels through lens 16 and into the environment, for example, in front of the vehicle. This relatively narrow, intense beam of light produced at the phosphor layer and output through the lens is the spotlight. The spotlight may be distinguishable by intensity from other light output from the headlight, if any, as described below.

Various techniques may be implemented to control movement of the laser beam relative to the phosphor layer and thereby control the directional output of the spotlight. Example system 10 of FIG. 1 relies upon various optical elements ("optics") to generate the laser beam and to direct the laser beam to the phosphor layer.

A steerable device 25 is configured to direct laser beam 24 from laser emitter 18 to a static mirror 26. Steerable device 25 is controllable to move the laser beam to different points on static mirror 26 and therefore to different spots on phosphor layer 15. In some implementations, steerable device 25 is or includes a micro-electromechanical system (MEMS) mirror that that is movable relative to static mirror 26. Steerable device 26 may be movable in one dimension (1D) or in two dimensions (2D) to direct the laser beam to different points on static mirror 26. For example, steerable device 25 may be mounted for movement on structure, such as an enclosure (not shown) that holds the vehicle's illumination system. Movement of the mirror relative the structure may be controlled using a motor (not shown) based on signals received from a control system 30, which is described in more detail below.

In this example, static mirror 26 does not move relative to other components of system 10; however, that need not be the case in all implementations. Accordingly, as indicated, movement of the laser beam to different spots on the phosphor layer is controlled through movement of steerable device 25. Additional optics, such as lens 32 may be located between static mirror 26 and steerable device 25. In this example, lens 32 has a convex face 32*a* and a flat face 32*b*, although lenses having different shapes may be used in some implementations. Lens 32 directs laser beam 24 to static mirror 26 and at least partially focuses laser beam 24 onto the phosphor layer of light source 11. In this example, lens 32 is also static in that it does not move relative to the other components of system 10, although that need not be the case in all implementations. Although one lens is shown, the additional optics may include two, three, four, or more lenses having different or the same shapes as lens 32.

In variants of the system described above, more than one of the components may move. For example, in addition to steerable device 25, mirror 26 and/or lens 32 may be configured for movement and controlled by one or more motors to move relative to other components of system 10. Coordinated movement between the various components may control positioning of the laser beam on the phosphor layer.

In some implementations, static mirror 26 may be omitted and lens 32 may be configured to direct, and to at least partially focus, the laser beam directly onto phosphor layer 15 of light source 11. For example, components 13 may be repositioned within system 10 so that laser beam 24 is provided directly to phosphor layer 15 without being bent by a static mirror or other optical components.

Figure 4:
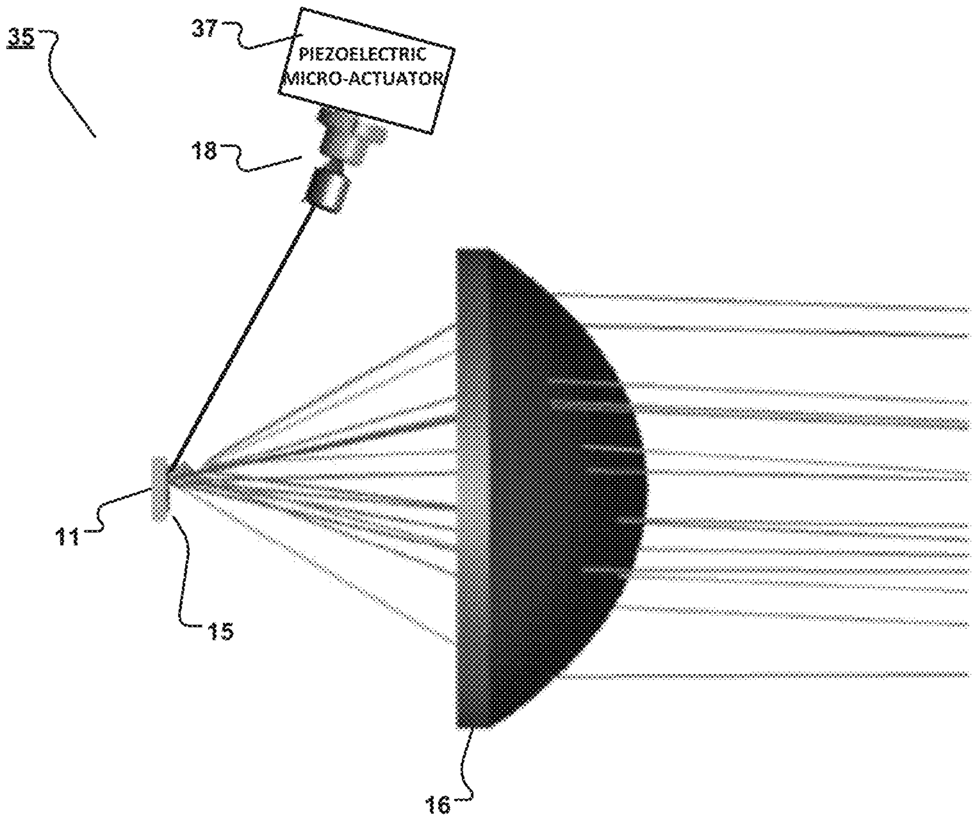
FIG. 4 is a schematic diagram of another example system configuration for generating a spotlight by directing laser light onto phosphor.

FIG. 4 shows an alternative system 35 to that shown in FIG. 1 for controlling application of the laser beam to the phosphor layer. In system 35, laser emitter 18 may be coupled to an XY piezoelectric micro-actuator 37 and may be controlled to apply the laser beam directly to different points on the phosphor layer. In this example, there may not be any intervening optics, such as lenses or mirrors, in the optical path between laser emitter 18 and phosphor layer 15. Example piezoelectric micro-actuators include transducers to convert electrical energy into a mechanical displacement based on a piezoelectric effect. A piezoelectric micro-actuator may be used to position the laser emitter since the micro-actuator can implement a small mechanical displacement at a relatively high speed. The laser emitter may be mounted to the micro-actuator, which itself may be mounted at to an enclosure of the vehicle illumination system within a line-of-sight of the phosphor layer. The operation of piezoelectric micro-actuator 37 may be controlled by the control system to move the laser emitter to different points in space in order to direct the laser beam to different points on the phosphor layer 15. The spotlight that is produced in this manner has the same attributes as those described herein.

The luminous flux produced at the location on the phosphor layer that is hit by the laser beam is a function of the optical power of the laser beam. In an example, a laser beam having an optical power of 1 Watt (W) may produce a luminous flux of 250 lumens at the location on the phosphor layer that is hit by the laser beam; a laser beam having an optical power of 2 W may produce a luminous flux of 500 lumens at the location on the phosphor layer that is hit by the laser beam; a laser beam having an optical power of 3 W may produce a luminous flux of 750 lumens at the location on the phosphor layer that is hit by the laser beam; and so forth. Laser beams having high optical powers may damage some phosphor. Therefore, the duration that the laser beam remains at a single location on the phosphor layer may be limited to single digit seconds (e.g., 1 to 9 seconds), tens of seconds (e.g., 10 to 99 seconds), or a single-digit minutes. These durations may depend on the magnitude of the optical power and/or the composition of the phosphor material. The duration of the spotlight, however, is not limited to these values or ranges.

The light produced at the location on the phosphor layer due to the laser-based phosphor excitation may have a luminous intensity that exceeds the luminous intensity of light that can be produced by light source 11 by illuminating its LEDs at the same location. In other words, the light produced at the location on the phosphor layer due to the laser-based phosphor excitation may have a luminous intensity that exceeds the luminous intensity of light that can be produced by light source 11 absent laser-based phosphor excitation. Luminous intensity may be defined as lumen per solid angle (measured in candela (cd)). In some examples, the luminous intensity of light produced at the location on the phosphor layer due to the laser-based phosphor excitation may exceed the luminous intensity of light produced during the headlight's high-beam mode of operation and during headlight's low-beam mode of operation. In some examples, the luminous intensity of light produced at the location on the phosphor layer due to the laser-based phosphor excitation exceeds the luminous intensity of the light produced during the headlight's current mode of operation. For example, the luminous intensity of light produced at the location on the phosphor layer due to the laser-based phosphor excitation may exceed the luminous intensity of light produced during the headlight's low-beam mode of operation but not the luminous intensity of light produced during the headlight's high-beam mode of operation.

In an example, using a blue laser, it is possible to produce a small spot on the phosphor layer that, in turn, provides a small divergence when placed in the focal plane of a lens. In some examples, a car headlight may generate a light beam having a luminous intensity of up to 10,000 cd. The spotlight produced using the techniques described herein may produce a spotlight having a luminous intensity of up to 1,000,000 cd in some implementations or a spotlight that is 100 times greater in luminous intensity than the native high-beam and low-beam of the headlight.

In some implementations, the optical power of the laser beam produced by laser emitter 18 is adjustable to adjust the luminous intensity of light produced at the spot. In some implementations, the optical power of the laser beam produced by laser emitter 18 is not adjustable, in which case variance in the luminous intensity produced at the spot occurs mainly due to the operation of the light source. That is, in some cases, there may be an additive effect caused by light produced by the light source and the light produced by hitting the phosphor layer with the laser beam.

When light source 11 is not activated (e.g., the light source is off), a spotlight may still be produced by applying the laser beam to the phosphor as described herein, since the light produced by the laser and phosphor is not dependent upon operation of the LED light source. The luminous intensity produced at such times may be the same, less, or more than the values described above.

The spotlight is controllable to move within and around the vehicle's external environment. Movement of the spotlight is controlled by controlling where the laser beam hits the phosphor layer. In an example, the laser beam may be controlled to move from point to point on the phosphor layer in order to change the direction that the spotlight moves within and around the vehicle's external environment. In an example, the laser beam may be controlled to scan across the phosphor layer to provide a spotlight that scans an area around the vehicle, for example, in front of the vehicle. In this regard, referring to FIG. 3, "the front" of the vehicle 40 is not limited to directly in front, but rather includes any area 43 that is in front of a line 45 parallel to the vehicle's front end. Likewise, "the back" of the vehicle is not limited to directly in back, but rather includes any area 46 that is in back of a line 44 parallel to the vehicle's back end.

Figures 5, 5A, 5B, 5C:
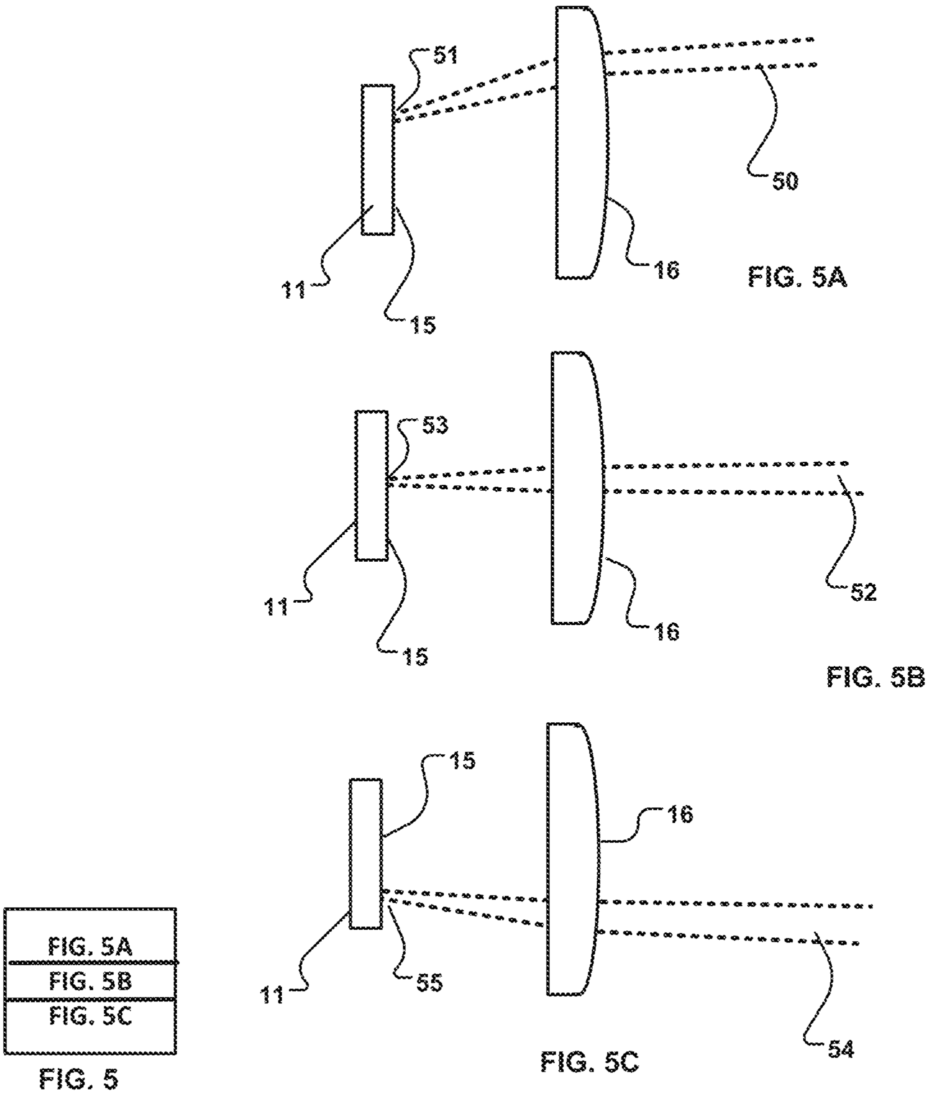
FIG. 5, comprised if FIGS. 5A, 5B, and 5C, shown different spotlights produced using the systems and techniques described herein.

FIG. 5A shows an example spotlight 50 produced when the laser beam hits spot 51 on phosphor 15. FIG. 5B shows an example spotlight 52 produced when the laser beam hits a different spot 53 on the same phosphor 15. FIG. 5*c* shows an example spotlight 54 produced when the laser beam hits a different spot 55 on the same phosphor 15. The directions of the three spotlight beams are different due to the change in position of the focal plane produced by lens 16. That is, The XY position of the laser spot on the phosphor layer 15 corresponds to different position of the focal plane produced by lens 16, which determines the direction of the output spotlight.

Figure 6:
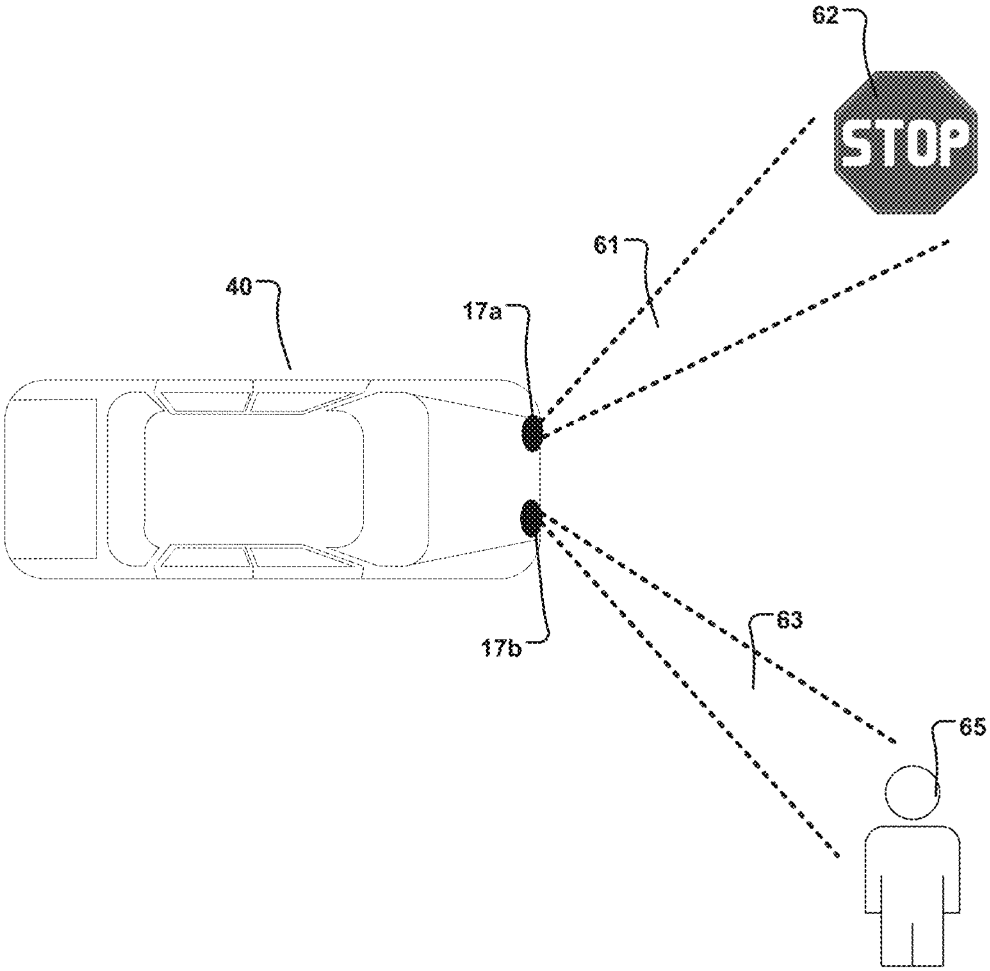
FIG. 6 shows a top view of an example vehicle producing spotlights through its headlights that are directed to two different objects.
Figure 7:
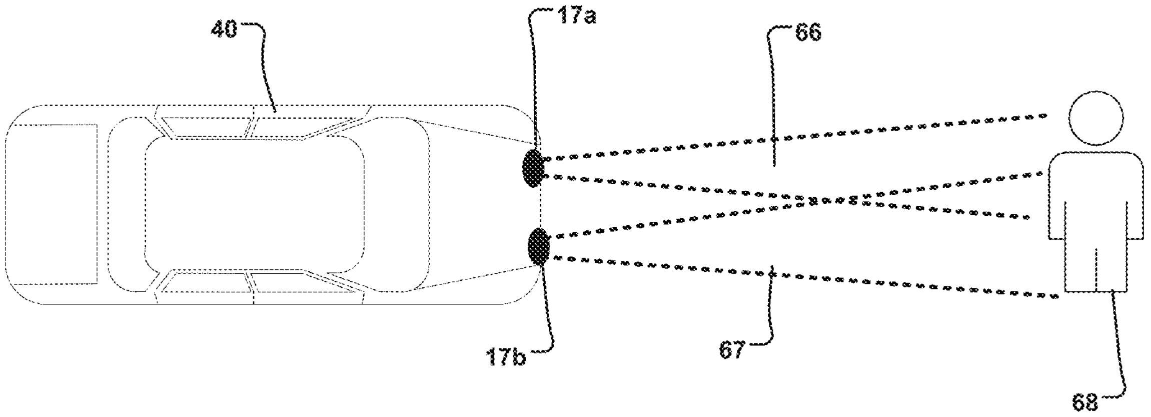
FIG. 7 shows a top view of an example vehicle producing spotlights through its headlights that are directed to a same object.

In some implementations, each headlight on a vehicle, such as vehicle 40 of FIG. 3, may be configured to produce a spotlight using the techniques described herein. The spotlights in the different headlights may be controlled independently and/or their control may be coordinated. For example, in FIG. 6, a spotlight 61 produced by a left headlight 17*a* may focus on a target 62 at the left-front of the vehicle and, concurrently, a different spotlight 63 produced by a right headlight 17*b* may focus on a different target 65 at the right-front of the vehicle. Alternatively, in the example of FIG. 7, spotlights 66, 67 from respective different headlights 17*a*, 17*b* may focus on the same target 68, such as an obstacle directly in front of the vehicle's path of travel.

The systems described herein, such as system 10 of FIG. 1, include a control system 30 to control all or part of the operation of the system components. The control system may be part of an onboard control system on a vehicle that implements spotlight functionality. As shown in FIG. 1, in some implementations, an onboard portion 86 of control system 30 includes one or more processing devices 69 of the type described herein that are programmable to control operations of at least some of the components of the system. The onboard portion 86 of control system 30 may also include memory 70 for storing data and programs executable by the one or more processing devices to implement all or part of the functionality described herein. The control system 30 may also include an external computing system 72 that communicates to the onboard control portion 86. For example, the external computing system 72 may communicate with the onboard control portion 86 using a cellular network or other appropriate wireless functionality. This may be useful in warning the onboard control portion of obstacles that are too far afield to be detected by the vehicles sensors, but that within the vehicle's projected path of travel.

The control system may cause the spotlight to be generated, and control its direction, based on operator/manual input or automatically (e.g., not in response to operator/manual input) based on one or more signals obtained from one or more sensors on the vehicle. For example, referring to FIG. 3, vehicle 40 may include one or more sensors 72 at its front, one or more sensors 74, 75 at its sides, one or more sensors 76 at its back, and one or more sensors 77 in or directed to its interior. The sensors at the front, sides, and back may include, for example, light detection and ranging (LIDAR) sensors to detect one or more environmental factors exterior to the vehicle. LIDAR is a method for determining ranges (e.g., variable distance) by targeting an object with a laser and measuring the time for the reflected light to return to the receiver. The sensors at the front, sides, and back may include, for example, light sensors to detect the amount of light in the environment. The sensors at the front, sides, and back may include, for example, one or more 2D or 3D cameras to capture images of, and to recognize objects, in the vicinity of the vehicle. The sensors in the interior of the vehicle may include, for example, one or more motion sensors or cameras that focus on movement of the operator or other in-cabin movements and that can be used to detect one or more environmental factors that are interior to the vehicle.

Figure 8:
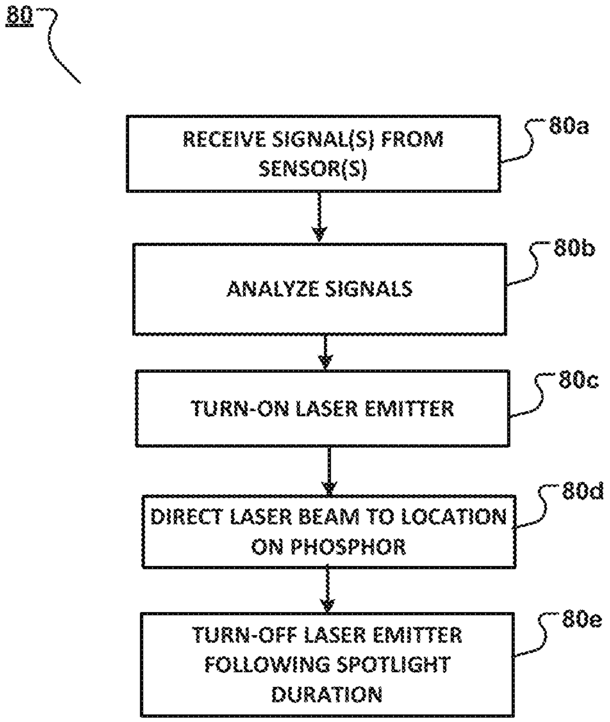
FIG. 8 is a flowchart showing an example process for generating a spotlight using the systems and techniques described herein.

FIG. 8 is a flowchart showing an example process 80 illustrating operation of the systems described herein. Process 80 may be performed, e.g., using the control system in combination with the sensors. Process 80 includes receiving (80*a*) one or more signals from one or more of the sensors. The signals may be based on, indicative of, or represent information, such as an external illumination in an environment where the vehicle is located, an object in a vicinity of the vehicle, operation of the vehicle over a predefined period of time, or movement of the operator. For example, light sensors may sense the external illumination, which may be indicative of the time of day (e.g., daytime or nighttime), and provide signals indicating the level of exterior light to the vehicle. LIDAR sensors may detect objects in the path of travel or in the vicinity of the path of travel that present potential obstacles or that may be of interest to the operator, such as animate or inanimate objects on a road or on a side of the road, and provide signals to the control system indicating the presence, size, and/or location of such objects. 2D or 3D cameras may capture images of objects in the path of travel or in the vicinity of the path of travel that present potential obstacles or that may be of interest to the operator, such as animate or inanimate objects on the road or on the side of the road (e.g., a STOP sign), and provide image data representing those objects to the control system. The control system may then use image recognition technology to identify the objects based on the image data. Motion sensors may sense the movements of the operator over time, which the control system may combine with information from other sensors to infer the operator's actions or lack thereof in response to obstacles or other features of interest identified by the other sensors. For example, the 2D or 3D cameras and/or LIDAR sensors may provide signals that the control system interprets as children on the side of the road. The motion sensors may detect that the operator has taken no action in response to detection of children on the side of the road one or more times during operation, and provide such signals to the control system. If this occurs more than a predefined number of times over a period of time, the control system may infer that the operator is routinely ignoring children on the side of the road. Motion sensors may detect eye movements of the operator, which may be indicative of the direction that the operator is looking while driving the vehicle. The control system may combine sensed eye movements with information from other sensors to control the spotlight. For example, if another sensor detects a STOP sign and the eye movements of the operator do not appear directed to the STOP sign, the spotlight may be controlled in the manner described below to illuminate the STOP sign.

Process 80 analyzes (80*b*) one or more of the signals from the sensors to determine whether to implement spotlight functionality and how or where to implement the spotlight functionality. In this regard, the control system may store, in memory, a set of predefined rules that dictate the conditions under which spotlight functionality is to be used. The control system may consult these rules based on the received sensor signals and cause a spotlight to be generated and output accordingly. For example, if the rules indicate that STOP signs are to be illuminated, and the sensor signals indicate that a STOP sign is in the vicinity of the vehicle, the control system may cause a spotlight to be generated automatically and to direct that spotlight at the STOP sign for a predefined duration. For example, if the rules indicate that animate objects such as animals or children are to be illuminated, and the sensor signals indicate that animate object are in the vicinity of the vehicle (based, e.g., on images or object movement), the control system may cause a spotlight to be generated automatically and to direct that spotlight at the animate objects for a predefined duration. For example, if the rules indicate that a spotlight is to be applied when the control system determines that the operator is routinely ignoring children on the side of the road, and the sensor signals indicate that children are on the side of the road, the control system may cause a spotlight to be generated automatically and to direct that spotlight at the children for a predefined duration. For example, the rules may specify intensities for the spotlight based on external illumination or the time of day. The spotlight that is generated therefore may have a greater or lesser luminous intensity based on such rules. For example, spotlights in daylight may be brighter than those in darkness.

To generate the spotlight, the control system turns-on (80_c_) the laser emitter and directs (80_d_) the resulting laser beam using any appropriate technique to a spot on the phosphor layer of the a light source (e.g., a GaN LED chip) based on where the sensor signal(s) indicate that the spotlight should be directed. As described above, the laser beam excites a spot on the phosphor layer to produce enhanced illumination at that spot. The light from that enhanced illumination exits the headlight and is directed at its intended target, which corresponds to the location of the spot.

As described previously, the maximum duration of the spotlight may be based, in part, on the composition of the phosphor layer. The spotlight may be deactivated by turning-off (80_e_) the laser emitter or, in some examples, redirecting the laser beam to a light-absorbing surface within an enclosure containing the illumination system.

As previously explained, in some implementations, the spotlight is controllable manually. Manual control may be used also in systems that implement automated control. For a manually-controlled spotlight, the operator may direct the spotlight using a control in the vehicle's interior. For example, a visual display in the vehicle's interior may show an image of the environment in the front of the vehicle. Through touch-control or use of a knob, pointer, or the like, the operator may specify a point to which the spotlight is to be directed. In response to such user input, the control system receives a signal identifying the intended location of the spotlight and performs the above-described control operations to generate the spotlight and to direct the spotlight to the location specified by the operator.

Figure 3A:
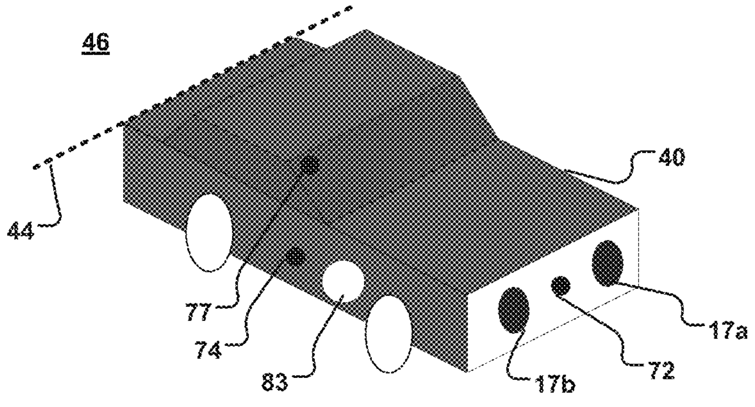
FIG. 3 includes FIG. 3A showing a front perspective view of an example vehicle containing the system for generating a spotlight and FIG. 3B showing a back perspective view of the same vehicle.
Figure 3:
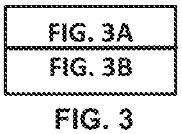
Figure 3B:
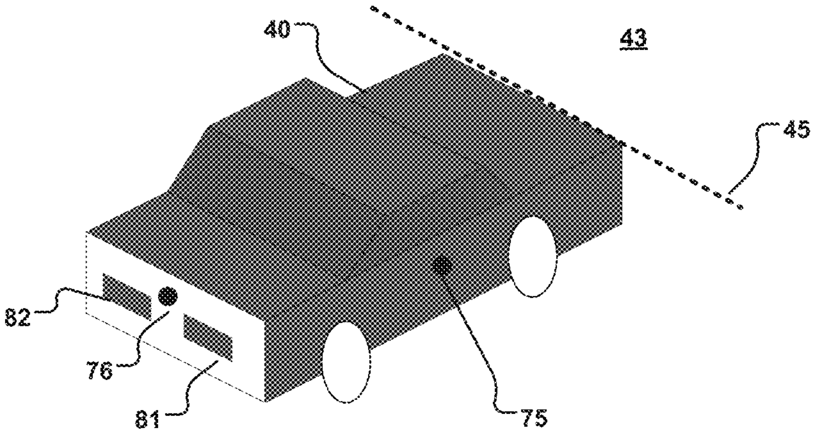

Although the preceding descriptions focus on producing a spotlight through a vehicle's headlight, a spotlight may be produced according to the techniques described herein for output from one or more vehicle taillights 81, 82 of FIG. 3B, one or more vehicle side lights 83 of FIG. 3A, or one or more vehicle lights pointing upward or downward (not shown) on the vehicle. Furthermore, the systems and techniques are not limited to use with automobiles, but rather may be used with any type of vehicle, whether operator-drive or automated.

All or part of the systems and processes described in this specification and their various modifications may be configured or controlled at least in part by one or more computers, such as control system 30, using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the systems and processes described herein can be performed by one or more programmable processors executing one or more computer programs to control or to perform all or some of the operations described herein. All or part of the systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:

a light source coated with a phosphor layer;

a laser emitter to output a laser beam;

a controller to control a direction of the laser beam so that the laser beam hits a location on the phosphor layer, the laser beam exciting the location on the phosphor layer to produce a beam of light at the location; and a lens having a first surface to receive the beam of light and a second surface that is convex to output the beam of light as a spotlight, wherein the light source comprises light emitting devices coated with the phosphor layer, the light emitting devices being configured to produce light without the laser beam exciting the location on the phosphor layer.

2. The system of claim 1, wherein the spotlight has a luminous intensity that exceeds a luminous intensity of light produced by the light source at the location absent the laser beam exciting the location.

3. The system of claim 1, wherein the controller is configured to control the direction of the laser beam so that the laser beam hits the location on the phosphor layer when the light source is activated.

4. The system of claim 1, wherein the controller is configured to control the direction of the laser beam so that the laser beam hits the location on the phosphor layer when the light source is not activated.

5. The system of claim 1, further comprising:

a steerable device to direct the laser beam to the phosphor layer.

6. The system of claim 5, wherein the steerable device comprises a micro-electromechanical device comprising a mirror that is movable.

7. The system of claim 5, further comprising:

a mirror to receive the laser beam from the steerable device and to reflect the laser beam to the phosphor layer, the steerable device being controllable by the controller to move the laser beam to different points on the mirror and therefore to different locations on the phosphor layer; and one or more optical elements in an optical path between the mirror and the steerable device, the one or more optical elements comprising a lens to focus the laser beam onto the phosphor layer.

8. The system of claim 1, wherein the laser emitter comprises:

a laser diode; and a collimating lens;

wherein the laser diode is configured to emit blue light and the phosphor layer is configured to convert the blue light to white light.

9. The system of claim 1, wherein the spotlight has a luminous flux of at least 250 Lumens and the laser beam has an optical power of at least 1 Watt.

10. The system of claim 1, wherein the phosphor layer comprises cerium-doped yttrium aluminum garnet.

11. The system of claim 1, wherein the phosphor layer comprises a europium doped nitridoaluminate.

12. The system of claim 1, wherein the light source comprises a gallium-nitride (GaN) based light-emitting diode (LED) device.

13. The system of claim 1, wherein the laser emitter is movable; and wherein movement of the laser emitter is controllable by the controller to control the direction of the laser beam so that the laser beam hits the location on the phosphor layer.

14. The system of claim 1, wherein the system comprises a vehicle; and wherein the light source is part of a headlight for the vehicle.

15. The system of claim 14, wherein the controller is configured to control the direction of the laser beam based on an external illumination in an environment in which the vehicle is located.

16. The system of claim 14, wherein the controller is configured to control the direction of the laser beam based on an object in a vicinity of the vehicle.

17. The system of claim 14, wherein the controller is configured to control a direction of the laser beam based on an operator of the vehicle.

18. The system of claim 1, wherein the light emitting devices comprise light emitting diodes (LEDs).

19. The system of claim 18, wherein the spotlight has a luminous intensity that exceeds a luminous intensity of light produced by the LEDs without the laser beam exciting the location on the phosphor layer.

20. The system of claim 1, wherein the first surface is flat.

21. The system of claim 1, wherein the second surface reduces dispersion of the light beam.

* * * * *